(12) United States Patent
Itou et al.

(10) Patent No.: US 6,292,939 B1
(45) Date of Patent: Sep. 18, 2001

(54) METHOD OF REDUCING UNNECESSARY BARRIER INSTRUCTIONS

(75) Inventors: Yoshihiro Itou, Yokohama; Kei Nakajima, Chigasaki, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/266,634

(22) Filed: Mar. 11, 1999

(30) Foreign Application Priority Data

Mar. 12, 1998 (JP) .................................................. 10-615508

(51) Int. Cl.[7] ........................................................ G06F 9/45
(52) U.S. Cl. .................................. 717/6; 717/5; 709/400; 709/104; 709/102
(58) Field of Search ............................ 717/6, 5; 709/400, 709/109, 102

(56) References Cited

U.S. PATENT DOCUMENTS

| | | | |
|---|---|---|---|
| 5,535,393 | * 7/1996 | Reeve et al. ............................... | 717/6 |
| 5,778,423 | * 7/1998 | Sites et al. ............................ | 711/118 |
| 5,781,775 | * 7/1998 | Ueno ..................................... | 709/102 |
| 5,802,374 | * 9/1998 | Gupta et al. ............................... | 717/6 |
| 5,873,105 | * 2/1999 | Tremblay et al. .................... | 707/206 |
| 5,953,736 | * 9/1999 | O'Connor et al. ........................ | 711/6 |
| 6,016,505 | * 1/2000 | Badovinatz et al. ................. | 709/205 |
| 6,081,665 | * 6/2000 | Nilsen et al. .............................. | 717/5 |
| 6,098,089 | * 8/2000 | O'Connor et al. .................... | 709/104 |
| 6,216,174 | * 4/2001 | Scott et al. ............................ | 709/400 |

OTHER PUBLICATIONS

Title: Eliminating redundant barrier synchronizations in rule–based programs, Anurag Acharya, ACM, 1996.*
Title: A simulation of dynamic task allocation in a distributed computer system, Ed Andert, ACM, 1987.*
Title: Semantics of barriers in a non–strict, implicitly–parallel language, Aditya et al, ACM, 1995.*
Title: Compiler optimizations for eliminating barrier synchronization, Chau–Wen Tseng; ACM, 1995.*
Title: Distributed shared memory system with improved barrier synchronization and data transfer, Tzeng, ACM, 1997.*

* cited by examiner

*Primary Examiner*—Mark R. Powell
*Assistant Examiner*—Chameli Chaudhuri Das
(74) *Attorney, Agent, or Firm*—Mattingly, Stanger & Malur, P.C.

(57) ABSTRACT

Unnecessary barrier instructions are dynamically reduced in a parallel processing object program, program module or object code section to be parallel processed in a multiprocessor system by a compiler that generates the parallel processing object program from a source program. The compiler divides the source program into parallel processing objects, issues a pre dynamic barrier instruction having parameters for barrier necessity determination that describe a first variable or array memory reference in the parallel processing object, which includes a parallel processing loop. In addition, the compiler issues a post dynamic barrier instruction having information in parameters about a second variable or array (or group of arrays) to be referenced after the parallel processing object. A dynamic barrier executing device uses a hardware system for checking for a data dependency between the first and second variable or array references to reduce unnecessary barrier instructions based on the parameters of the pre and post dynamic barrier instructions.

17 Claims, 4 Drawing Sheets

METHOD OF REDUCING UNNECESSARY BARRIER INSTRUCTIONS

FIELD OF THE INVENTION

The present invention generally relates to a method of reducing unnecessary barrier instructions and, more particularly, to a method of reducing unnecessary barrier instructions affecting the execution performance of parallel processing of an object program in a multiprocessor system.

BACKGROUND OF THE INVENTION

A general barrier instruction issuing condition in a multiprocessor system occurs when a dependency between a certain data reference and a following data reference or the dependency relationship is unclear. If the presence or absence of this data dependency cannot be determined except at the time of instruction execution, or the dependency analysis of a compiler is disabled, barrier instructions are output for execution in the parallel processing object program.

Conventional methods for reducing unnecessary barrier instructions are known. In one example, a barrier instruction reduction directive statement for a compiler is inserted with a user directive statement or a data dependency cancellation directive statement is inserted in the source program.

FIG. 3 shows an example of a source program in which a directive statement for reducing unnecessary barrier instructions is inserted. This source program is written in an implementation of FORTRAN that is extended for paralleling capability. A description of an example of the source program is as follows.

The source program shown in the example of FIG. 3 includes a DO loop 31 for iterative execution of processing by substituting the values i=1 to n sequentially into an array indicated by a(i). If an overlap between the reference range of array "a" in the DO loop 31 and the reference range of a following array 33 cannot be determined at the time of compilation and therefore can be determined only at the time of instruction execution, a barrier instruction reducing directive statement 32 for the compiler needs to be inserted by the user with a user directive statement. It should be noted that this directive statement 32 may be a data dependency cancellation directive statement. It should also be noted that "POPOPTION" is a directive statement indicating that the user provides a directive for paralleling a portion of the program that cannot be automatically put in parallel processing form by a parallel processing capability implemented by a FORTRAN processing system.

SUMMARY OF THE INVENTION

Generally, the execution of a barrier instruction causes overhead. The execution performance of the processing system is decreased by the amount of execution of unnecessary barrier instructions. The above-mentioned prior art is intended to reduce the number of unnecessary barrier instructions to prevent an associated decrease in execution performance of the processing system. However, the conventional methods are not suitable for removing all of the unnecessary barrier instructions unless the user knows very well the way in which the parallel program will execute. Thus, a problem arises in that it is difficult to remove all of the unnecessary barrier instructions.

It is therefore an object of the present invention to provide a method of reducing unnecessary barrier instructions by which unnecessary barrier instructions are dynamically reduced without user (human) intervention, thereby enhancing the execution performance of the object code or module.

According to one aspect of the invention, unnecessary barrier instructions are reduced in a compiler for generating a parallel processing object program from a source program, wherein the compiler converts the source program into parallel processing objects (parallel processing execution divisions), which are units or blocks of code for parallel processing, and preferably issues immediately before a parallel processing execution division, a pre dynamic barrier instruction having information in parameters used for determining the necessity for a barrier. Further, preferably the compiler issues a post dynamic barrier instruction immediately before a reference position, which is a point in the source code or object code before each variable or array reference (or group of array references) to be referenced after a parallel processing loop in the parallel processing execution division. The post dynamic barrier instruction has information in parameters thereof for determining the necessity for a barrier. Further, according to the invention, the parallel processing object program is preferably implemented by a hardware system for determining the presence or absence of data dependency, thereby dynamically reducing unnecessary barrier instructions based on the parameters of the pre dynamic barrier instruction and the post dynamic barrier instruction.

The above-mentioned object is also achieved by a compiler that generates, in converting the source program into the parallel processing object program or module, an instruction inserted before a parallel processing execution division having a parameter(s) with information used for determining the necessity for a barrier and an instruction inserted after the parallel processing execution division having a parameter(s) with information used for determining the necessity of a barrier before a variable or an array reference to be referenced after the parallel processing execution division. Further, the compiler determines the presence or absence of data dependency based on these parameters to dynamically switch between execution and nonexecution of a barrier instruction.

The above-mentioned object is also achieved, according to an embodiment of the invention, by a device that executes parallel processing of object code including dynamically determining the necessity for a barrier operation by checking whether any of the following barrier instruction deletable conditions (1) through (3) are met by processing a parameter (s) with hardware, wherein a compiler generates a sequence of instructions to be used in making the determination or is provided with means for generating a code for switching between execution or nonexecution of a barrier instruction by a branch instruction that uses the barrier instruction deletable conditions (1) and (2) as a decision equation.

The barrier instruction deletable conditions are as follows:

(1) Between PEs (Processor Elements), no dependency exists between a variable reference or an array reference to be referenced and a following reference;

(2) Between PEs, a dependency exists between a variable reference or an array reference to be referenced and a following reference but this dependency is only within the same PEs and no dependency exists between different PEs; and (3) In hardware, memory coherence processing has been completed at a memory location at which a dependent relation occurs between PEs.

DETAILED DESCRIPTION OF THE PREFERRED EMBODIMENTS

The following describes a method of reducing unnecessary barrier instructions according to a preferred embodiment of the invention with reference to FIGS. 1–5.

Figure 1:
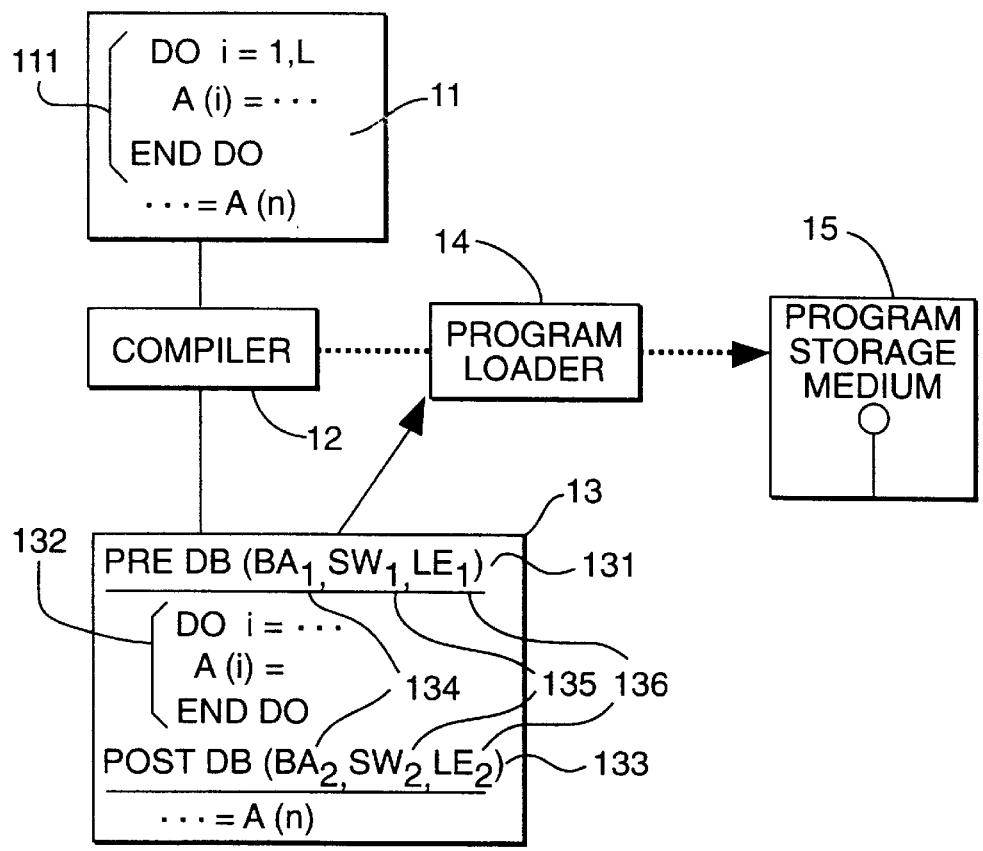
FIG. 1 is a diagram illustrating a schematic configuration of a pseudo FORTRAN language code and system for describing a hardware-based method of reducing unnecessary barrier instructions according to a preferred embodiment of the invention.
Figure 2:
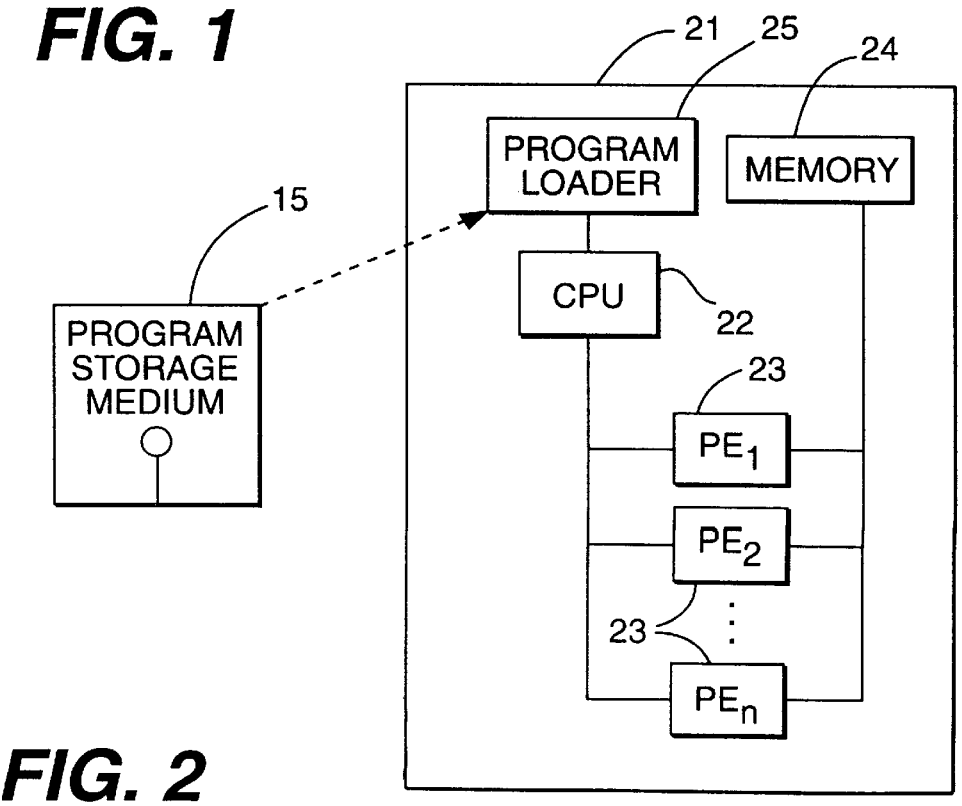
FIG. 2 is a block diagram illustrating an example of a configuration of a multiprocessor system to which the present invention is applied.

FIG. 1 shows a schematic configuration of pseudo FORTRAN language code and a system used for performing a method of reducing unnecessary barrier instructions according to a preferred embodiment of the invention. FIG. 2 is a block diagram illustrating an example of the configuration of a multiprocessor to which the present invention is applied. In particular, FIGS. 1 and 2 show a source program 11, a compiler 12, a parallel processing object 13, such as an object program, module or section of object code, a program loader 14, a program storage medium 15, a multiprocessor system 21, a CPU 22, and a processor element (PE) 23.

As shown in FIG. 2, the multiprocessor system 21 to which the present invention is applied includes a program loader 25 for reading programs from a program storage medium 15, a CPU 22 for distributing the programs to processor elements (PEs) 23 that execute the programs. In operation, the multiprocessor system 21 receives parallel processing objects, which are preferably from the source program that have been put in form for parallel processing by the compiler 12, through the program storage medium 15 or directly from the compiler 12 at the program loader 25 and the CPU 23 distributes the parallel processing objects to the plural PEs 23, respectively. The compiler is a program stored as executable instructions on a storage medium or in memory 24. The PEs 23 are connected to memory 24 and operate in a shared memory system according to the preferred embodiment, but each of the PEs could have its own memory and operate in a distributed memory system.

The following describes the method of reducing unnecessary barrier instructions practiced according to a preferred embodiment of the invention.

Figure 3:
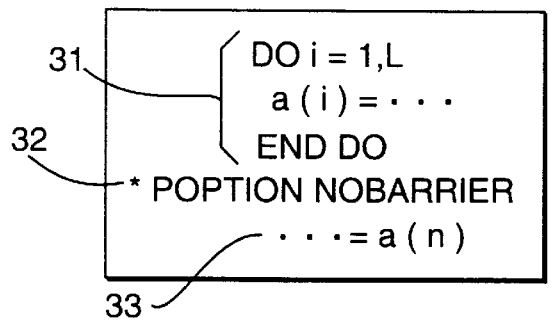
FIG. 3 is a diagram illustrating an example of a source program having an inserted directive statement for reducing unnecessary barrier instructions.

Referring to FIG. 1, the source program 11 has a DO loop 111 that is the same as a DO loop 31 in the prior art described with reference to FIG. 3. The compiler 12 transforms source program 11 into a plurality of parallel processing objects 13 (object code section or module, shown schematically in the figure for purposes of illustration). The parallel processing object, for example, 13 is a code section (parallel processing execution division) that includes a parallel processing loop for parallel-processing. The DO loop 111 of the source program 11 is to be parallel processed using the PEs 23 of the multiprocessor system shown in FIG. 2.

In transforming the DO loop 111 of the source program 11 into the parallel processing loop 132, a pre dynamic barrier instruction 131 and a post dynamic barrier instruction 133 are inserted to include parameters used to determine the presence or absence of a barrier, which is a determination to be made with hardware in the first embodiment or by software in the second embodiment. The pre dynamic barrier instruction 131 has parameters used for determining the necessity for a barrier of a variable or array reference to be referenced inside the parallel processing loop 132. The barrier instruction 131 is issued immediately before the parallel processing loop 132. The post dynamic barrier instruction 133 has information in parameters relating to a variable or array reference (or group of array reference) to be referenced after the parallel processing loop 132. The post dynamic barrier instruction is issued immediately before a reference position, which is a point in the source code or object code occurring before each array reference or several array references. The pre dynamic and post dynamic instructions specify, in the parameters, information of a base address (BA) 134, a stride width (SW) 135, an element length (EL) 136, and total number of elements (TN) 137 for the (first) variable or array reference in the parallel processing loop and the (second) variable or array reference to be referenced after the parallel processing loop, respectively as shown in FIG. 1.

The program based on the parallel processing object 13 generated by the compiler 12 as described above is stored in the program storage medium 15 by the program loader 14 to be passed to the multiprocessor system. The program storage medium 15 may be any of DAT, CMT, FD, CD-ROM, and MO, for example.

Figure 5:
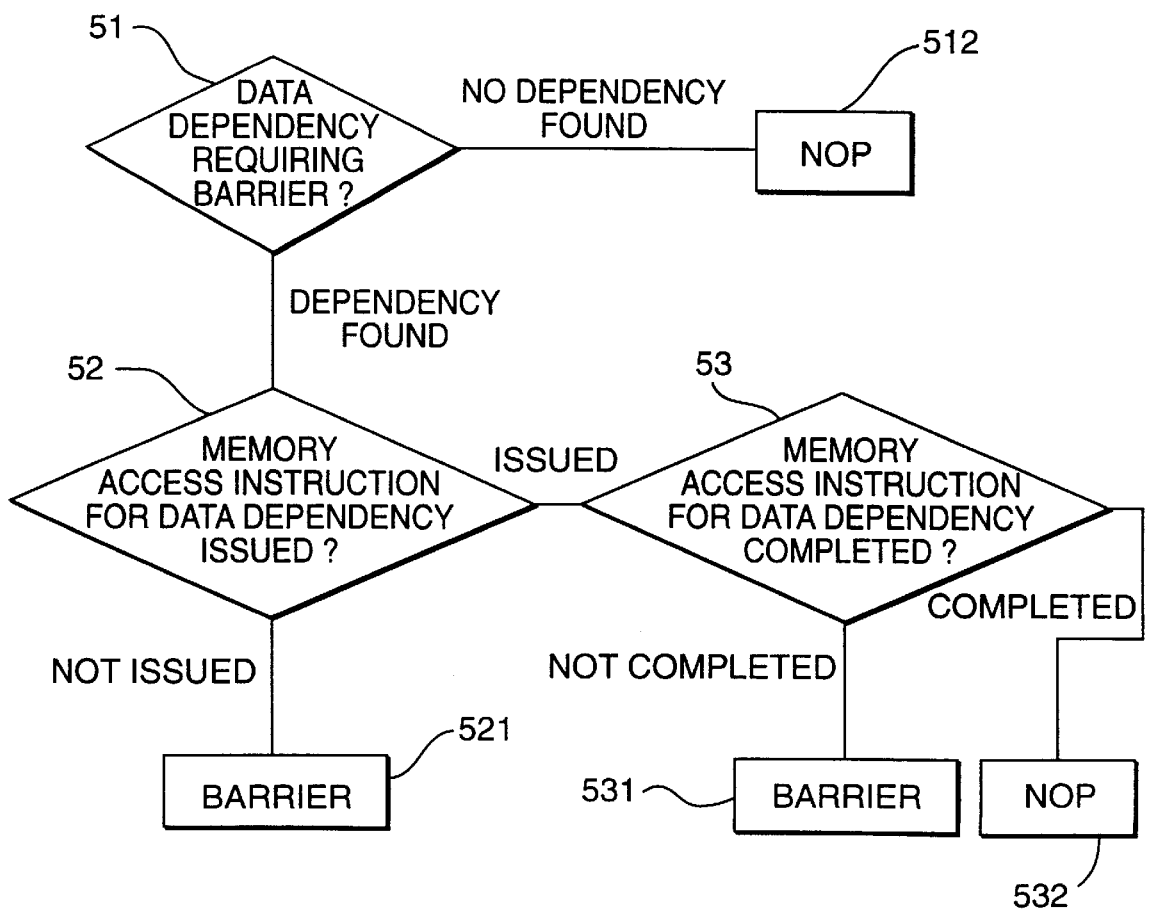
FIG. 5 is a flowchart of the operations followed in checking for the presence of a data dependency requiring a barrier by a dynamic barrier executing device and determining whether an instruction therefor has been completed.
Figure 4:
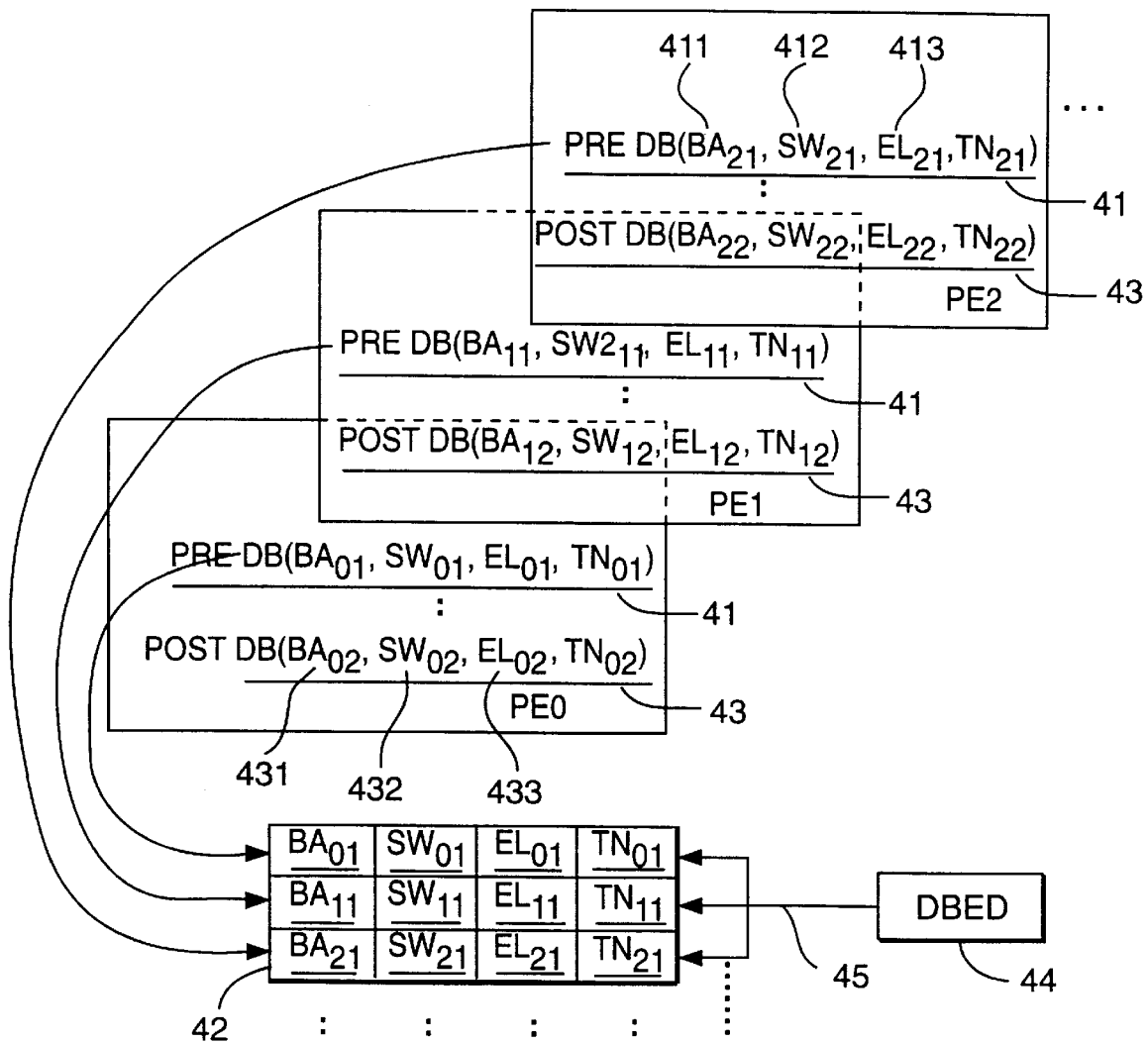
FIG. 4 is a diagram illustrating the way in which pre dynamic barrier instructions and post dynamic barrier instructions are executed on each PE.

FIG. 4 illustrates the way in which pre dynamic barrier instructions and post dynamic barrier instructions are handled on each PE. FIG. 5 is a flowchart showing the processing followed in making the determination, with a dynamic barrier executing device, whether there is a data dependency that requires a barrier and determining whether the execution of a memory access instruction for the data dependency has been completed.

First, referring to FIG. 4, the way in which the pre and post dynamic barrier instructions are handled on each PE (PE0 to PEn) will be described. Each of the PEs 23, upon execution of a pre dynamic barrier instruction 41, stores information including a base address ($BA_{o1}$–$BA_{n1}$) 411, a stride width ($SW_{o1}$–$SW_{n1}$) 412, an element length ($EL_{o1}$–$EL_{n1}$) 413, and total number of elements ($TN_{o1}$–$TN_{n1}$) 414 for the variable or array reference to be referenced in the parallel processing loop 132, which are parameters or arguments, into each PE field of a communication register 42 which is connected to CPU 22. Also, a post dynamic barrier instruction 43 is issued with parameters having information including a base address ($BA_{o2}$–$BA_{n2}$) 431, a stride width ($SW_{o2}$–$SW_{n2}$) 432, an element length ($EL_{o2}$–$EL_{n2}$) 433, and total number of elements ($TN_{o2}$–$TN_{n2}$) 434 for a variable or array reference to be referenced after the parallel processing loop execution.

A hardware-based dynamic barrier executing device (DBED) 44, which is implemented in logic, not shown, that is part of the system 21 shown in FIG. 2, checks for a data dependency with respect to memory 24 to determine if a barrier is required. The determination is made by use of the parameters 431, 432 and 433 for each PE, respectively, specified in the post barrier instruction 43 and the corresponding information of parameters 411, 412 and 413 stored in the communication register 42 at execution of the pre dynamic barrier instruction 41. The DBED also determines whether a memory access instruction therefor has been completed (or memory coherence processing has been completed).

The following describes the above-mentioned decision processing to be performed by the DBED 44 (dynamic barrier executing device) with reference to FIG. 5.

(1) First, the DBED checks for a data dependency that requires a barrier instruction. If no such data dependency is found, the DBED issues an NOP (No Operation) instruction (steps 51 and 512).

(2) If a data dependency requiring a barrier instruction is found in step 51, then the DBED checks whether a memory access instruction in the parallel loop for the data dependency has been issued. If the memory access instruction has not been issued, the DBED issues a BARRIER (a barrier instruction) (steps 52 and 521).

(3) If the memory access instruction is found issued in step 52, the DBED checks for the completion of that instruction (or the completion of coherence processing). If the execution of the memory access instruction is found completed, the DBED issues an NOP (steps 53 and 532).

(4) If the execution of the memory access instruction is found to be not completed in step 53, indicating the need for a barrier, the DBED issues an instruction for a barrier, a BARRIER (step 531).

In the above-mentioned processing flow, the processing in step 51 for checking for the data dependency that requires a barrier instruction is implemented by performing the following operation.

The base address, stride width, element length and total number of elements for a (first) variable or array reference is stored in the communication register 42 by a pre dynamic barrier instruction as $BA_i$, $SW_i$, $EL_i$, and $TN_i$ for each $PE_i (0 \leq i \leq max_{IPno}$, $max_{IPno}$: maximum PE number) and the base address, stride width, element length, and total number of elements for a (second) variable or array reference is stored in the communication register 42 by a post dynamic barrier instruction as $BA_j$, $SW_j$, $EL_j$, and $TN_j$ for each $PE_j (0 \leq j \leq max_{IPno}$, $max_{IPno}$: maximum PE number). Given these stored variables, if:

$$W_i \cap R_j \neq \phi \{0 \leq \exists_i \neq \exists_j \leq max_{IPno}\} \quad \text{(relation 1)}$$

for the set $W_i = \{BA_i + SW_i * n_i, BA_i + SW_i * n_i + 1, BA_i + SW_i * n_i + 2, \ldots, BA_i + SW_i * n_i + EL_i - 1 | 0 \leq n_i \leq TN_i - 1\}$ and the set $R_j = \{BA_j + SW_j * n_j, BA_j + SW_j * n_j + 1, BA_j + SW_j * n_j + 2, \ldots, BA_j + SW_j * n_j + EL_j - 1 | 0 \leq n_j \leq TN_j - 1\}$ then, the data dependency is found to be one that requires a barrier instruction. That is, if there is a memory dependency or overlap in a variable or array reference in the parallel processing loop and a following variable or array reference, a barrier instruction is required.

Figure 6:
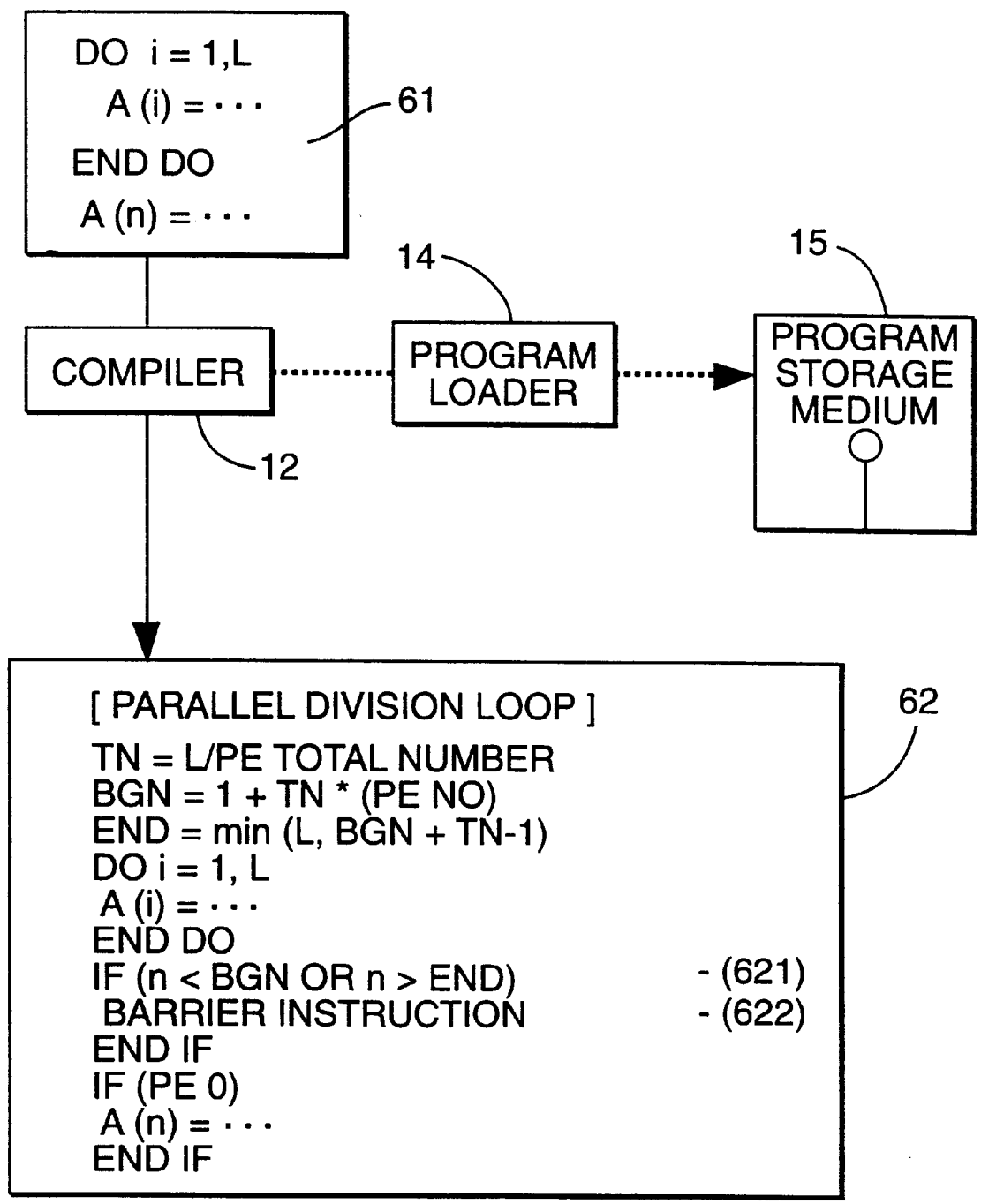
FIG. 6 is a diagram illustrating a schematic configuration of pseudo FORTRAN language code and a system for describing a software-based method of reducing unnecessary barriers according to another preferred embodiment of the invention.

FIG. 6 shows a schematic configuration of pseudo FORTRAN language code and a system for a software-based method of reducing unnecessary barriers according to another preferred embodiment of the invention. The following describes the above-mentioned processing of step 51 for checking for a data dependency that requires a barrier instruction. The example shown in FIG. 6 is generally the same as that shown in FIG. 1 except for the format of the source program 61 and the format of the parallel division loop 62, which is a parallel processing object to be converted.

To be more specific, as shown in FIG. 6, the above-mentioned decision of the relation (1) can be performed by transforming, with the compiler 12, the source program 61 into the parallel processing object program (code section or module) 62 to include a decision relation of an "if" statement 621, such as a conditional branch statement 621 having an argument that, if satisfied, results in execution of the branch instruction. Specifically, applying the above-mentioned relation (1) to the statement 621 can generate a branch instruction to be followed, which is in object code, for switching between execution of a barrier instruction 622 and non-execution (following the branch) of the barrier instruction 622. Then, the parallel processing object code executing device can reduce unnecessary barrier instructions by executing this branch instruction for switching between execution and non-execution.

According to the above-mentioned second preferred embodiment of the invention, the following three barrier instruction deletable conditions are provided:

(1) between PEs (Processor Elements), no dependency exists between a variable or array reference to be referenced and a following reference;

(2) between PEs, dependency exists between a variable or array reference to be referenced and a following reference but this dependency is only within the same PE and no dependency exists between different PEs; and (3) in hardware, memory coherence processing has been completed at a memory location at which a dependent relation occurs between PEs.

Whether at least one of these conditions (1) through (3) is satisfied is determined by generating code for switching between execution and non-execution of a barrier instruction by a branch instruction having a decision relation, e.g. an "if" statement, based on the above-mentioned barrier instruction deletable conditions (1) and (2), thereby providing the dynamic determination whether a barrier operation is required or not. This allows the dynamic deletion of unnecessary barrier instructions under certain conditions by using a branch instruction to avoid execution of the barrier instruction, resulting in enhanced execution performance of a multiprocessor system.

As mentioned above and according to the invention, unnecessary barrier instructions in a parallel processing program having a dependency relationship known only at instruction execution can be dynamically deleted under certain conditions, resulting in the enhanced execution performance of a multiprocessor system.

While preferred embodiments have been set forth with specific details, further embodiments, modifications and variations are contemplated according to the broader aspects of the present invention, all as determined by the spirit and scope of the following claims.

We claim:

1. A method of reducing unnecessary barrier instructions in a compiler for generating a parallel processing object program from a source program, comprising the steps of:

transforming with said compiler said source program into parallel processing execution divisions issuing a post dynamic barrier instruction immediately before a reference position following said parallel processing execution divisions, said post dynamic barrier instruction having parameters with information used for determining the necessity of a barrier for a variable reference or array reference to be referenced after said parallel processing execution division, determining whether there is data dependency present for a variable or array in said parallel processing execution division and said variable reference or array reference to be referenced after said parallel processing execution division based on the parameters of said post dynamic barrier instruction, and dynamically reducing unnecessary barrier instructions in accordance with said determining whether data dependency is present.

2. A method of reducing unnecessary barrier instructions according to claim 1, further including issuing, immediately before said parallel processing execution divisions, a pre dynamic barrier instruction having parameters for determining whether a barrier instruction is issued by said compiler, wherein said determining of whether there is data dependency present for a variable or array in said parallel processing execution division and said variable reference or array reference to be referenced after said parallel processing execution division is based on the parameters of said pre dynamic and said post dynamic barrier instructions.

3. A method of reducing unnecessary barrier instructions according to claim 2, further including, following said step of determining whether there is data dependency, checking if a memory access instruction in the parallel processing execution division has been issued and issuing a barrier instruction if said memory access instruction has not been issued.

4. A method of reducing unnecessary barrier instructions according to claim 2, further including, following said step of determining whether there is data dependency, checking if a memory access instruction for the data dependency has been issued and determining whether said memory access instruction has been completed, wherein if said memory access instruction has been issued and has been completed, a barrier instruction is not issued by said compiler.

5. A method of reducing unnecessary barrier instructions in a multiprocessor system including a compiler for generating a parallel processing object program from a source program, including converting said source program into parallel processing objects having parallel processing loops, issuing a predynamic barrier instruction immediately before at least one of said parallel processing loops that has at least one parameter designating information about a first variable or array reference in said one loop, inserting a reference position before at least one second variable or array reference following said parallel processing loop and issuing a post dynamic barrier instruction immediately before said reference position having at lest one parameter with information about said second variable or array reference and determining whether there is a data dependency present for said first variable or array based on the parameters of said pre dynamic and post dynamic barrier instructions, and dynamically reducing unnecessary barrier instructions in accordance with said determining whether data dependency is present.

6. A method of reducing unnecessary barrier instructions according to claim 5, wherein in said step of dynamically reducing unnecessary barrier instructions, a barrier instruction is not issued by said compiler if no data dependency is determined to be present for said first variable or array reference according to said determining step.

7. A method of reducing unnecessary barrier instructions according to claim 5, wherein in said step of dynamically reducing unnecessary barrier instructions, determining if a memory access instruction for the data dependency is issued and if said memory access instruction for data dependency is determined to be issued, further determining if said memory access instruction has been completed, wherein a barrier instruction is not issued by said compiler if said memory access instruction has been completed.

8. A method for reducing unnecessary barrier instructions according to claim 7, further including specifying, for each of said first and second variable or array reference, respectively, a base address, a stride width and an element length as said parameters for said pre dynamic post dynamic barrier instructions, respectively.

9. A multiprocessor system including a compiler for generating a parallel processing object program from a source program, said compiler converting said source program into parallel processing objects having parallel processing loops, issuing a pre dynamic barrier instruction immediately before at least one of said parallel processing loops that has at least one parameter designating information about a first variable or array reference in said one loop, inserting a reference position before a second variable or array reference following said parallel processing loop and issuing a post dynamic barrier instruction immediately before said reference position having at lest one parameter with information about said second variable or array reference; and a dynamic barrier executing device that determines whether there is a data dependency present for said first variable or array based on the parameters of said pre dynamic and post dynamic barrier instructions, wherein said compiler dynamically reduces unnecessary barrier instructions in accordance with said determination of whether data dependency is present made by said dynamic barrier executing device.

10. A multiprocessor system according to claim 9, wherein said compiler does not issue a barrier instruction if said dynamic barrier executing device determines that no data dependency is present for said first variable or array reference.

11. A multiprocessor system according to claim 9, wherein said dynamic barrier executing device determines if a memory access instruction for the data dependency is issued and if said memory access instruction for data dependency is determined to be issued, further determines if said memory access instruction has been completed, wherein said compiler does not issue a barrier instruction if said memory access instruction has been completed.

12. A method of reducing unnecessary barrier instructions in a multiprocessor system including a compiler for generating a parallel processing object program from a source program, including:

converting said source program into parallel processing objects having parallel processing loops, issuing a pre dynamic barrier instruction immediately before at least one of said parallel processing loops that has at least one parameter designating information about a first variable or array reference in said one loop, inserting a reference position before a second variable or array reference following said parallel processing loop, issuing a post dynamic barrier instruction immediately before said reference position having at least one parameter with information about said second variable or array reference determining whether there is a data dependency present for said first variable or array based on the parameters of said pre dynamic and post dynamic barrier instructions, and inserting a conditional branch statement and a barrier instruction in said parallel processing object after said one loop, said conditional branch instruction having an argument that is satisfied if the data dependency is determined to be not present, wherein said branch is followed to prevent said barrier instruction from being executed when said argument of said conditional branch statement is satisfied.

13. A computer readable storage medium encoded with executable instructions representing a compile program that generates a parallel processing object program from a source program, said compile program comprising:

converting said source program into parallel processing objects having parallel processing loops, issuing a pre dynamic barrier instruction immediately before at least one of said parallel processing loops that has at least one parameter designating information about a first variable or array reference in said one loop, inserting immediately before a reference position for at least one second variable or array reference following said parallel processing loop a post dynamic barrier instruction having at lest one parameter with information about said second variable or array reference, determining whether there is a data dependency present for said first variable or array based on the parameters of said pre dynamic and post dynamic barrier instructions, and dynamically reducing unnecessary barrier instructions in accordance with said determining whether data dependency is present.

14. A computer readable storage medium encoded with executable instructions representing a compile program according to claim 13, wherein a barrier instruction is not issued by said compiler program if no data dependency is determined to be present for said first variable or array reference according to said determining step.

15. A computer readable storage medium encoded with executable instructions representing a compile program according to claim 13, including determining if a memory access instruction for the data dependency is issued and if said memory access instruction for data dependency is determined to be issued and further determining if said memory access instruction has been completed, wherein a barrier instruction is not issued by said compiler program if said memory access instruction has been completed.

16. A computer readable storage medium encoded with executable instructions representing a compile program according to claim 15, further including specifying, for each of said first and second variable or array reference, respectively, a base address, a stride width and an element length as said parameters for said pre dynamic post dynamic barrier instructions, respectively.

17. A computer readable storage medium encoded with executable instructions representing a compile program that generates a parallel processing object program from a source program, said compile program comprising:

converting said source program into parallel processing objects having parallel processing loops, issuing a pre dynamic barrier instruction immediately before at least one of said parallel processing loops that has at least one parameter designating information about a first variable or array reference in said one loop, inserting a reference position before a second variable or array reference following said parallel processing loop, issuing a post dynamic barrier instruction immediately before said reference position having at least one parameter with information about said second variable or array reference determining whether there is a data dependency present for said first variable or array based on the parameters of said pre dynamic and post dynamic barrier instructions, and inserting a conditional branch statement and a barrier instruction in said parallel processing object after said one loop, said conditional branch instruction having an argument that is satisfied if the data dependency is determined to be not present, wherein said branch is followed to prevent said barrier instruction from being executed when said argument of said conditional branch statement is satisfied.

* * * * *